United States Patent [19]
Stoddard

[11] 3,975,979
[45] Aug. 24, 1976

[54] SERPENTINE LINCH PIN
[76] Inventor: Leo H. Stoddard, P.O. Box 423, Arab, Ala. 35016
[22] Filed: July 30, 1975
[21] Appl. No.: 600,227

[52] U.S. Cl. .................................................. 85/8.3
[51] Int. Cl.² ........................................ F16B 21/00
[58] Field of Search .............. 301/111, 113; 85/8.3, 85/8.6, 5 CP; 295/50

[56] References Cited
UNITED STATES PATENTS
| | | | |
|---|---|---|---|
| 279,753 | 6/1883 | Heritage | 85/8.3 |
| 1,390,609 | 9/1921 | France | 85/8.3 |

FOREIGN PATENTS OR APPLICATIONS
981,278   5/1951   France ..................................... 85/8.3

Primary Examiner—Allen N. Knowles
Assistant Examiner—Hadd S. Lane
Attorney, Agent, or Firm—Robert Henderson

[57] ABSTRACT

A relatively rigid linch pin having a portion of serpentine shape extending loosely through a transverse bore in a bolt, serves to oppose sliding of a collar or the like from the bolt; the serpentine character of said portion of the linch pin permitting easy sliding of said pin into said bore while opposing dislodgment of the linch pin from the bolt.

4 Claims, 3 Drawing Figures

U.S. Patent  Aug. 24, 1976  3,975,979
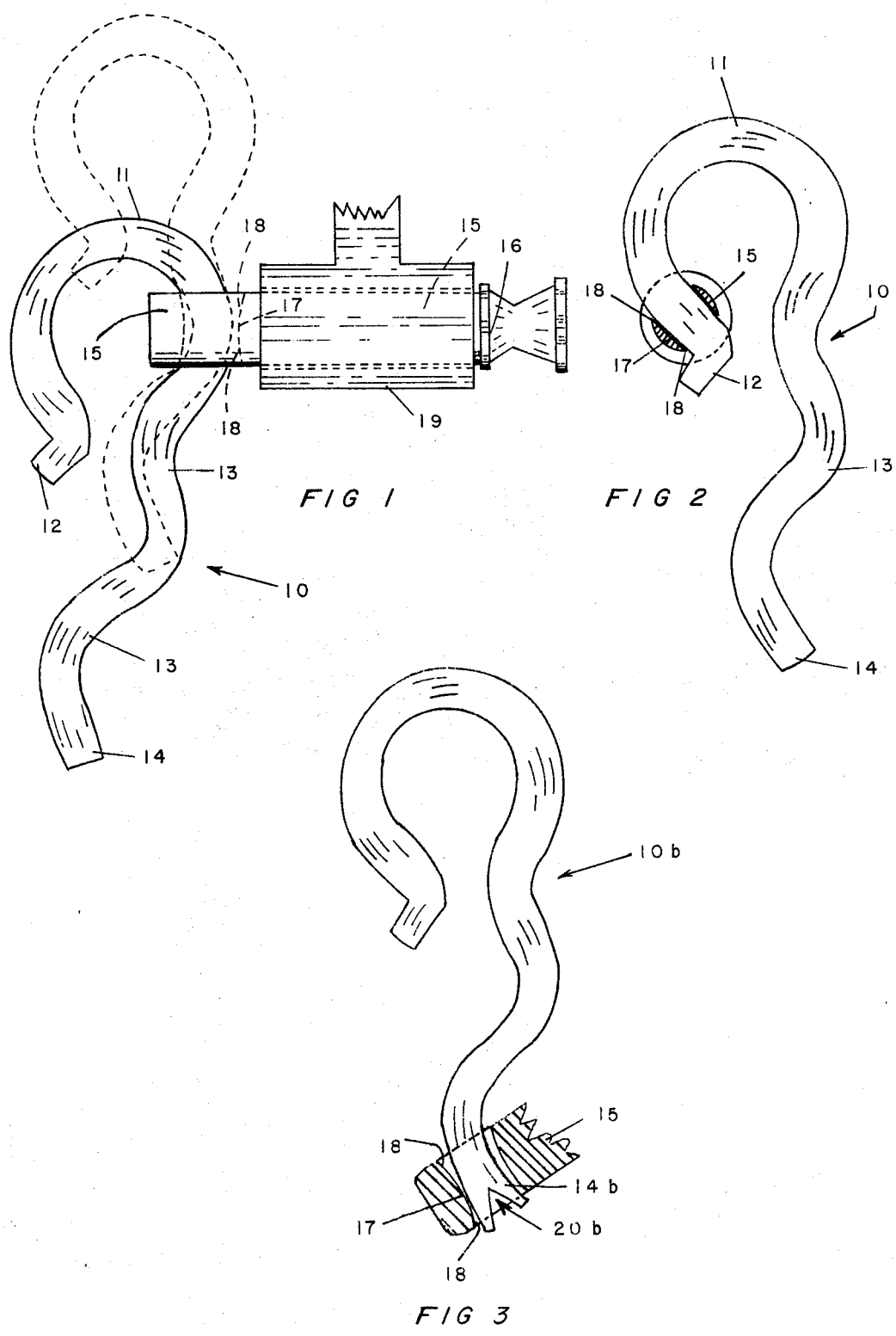

SERPENTINE LINCH PIN

BACKGROUND OF THE INVENTION

The need to prevent dislodgment of a linch pin from a bore in a bolt has hitherto usually been dealt with by providing the linch pin with somewhat flexible wing portions or other flexible portions which tightly engage outside areas of the bolt to prevent such dislodgment. Where, as is often the case, the linch pin is a part of a combination of very sturdy elements, the pin's somewhat flexible portions are sufficiently resistant to flexing that the pin must be hammered or otherwise very forcefully set into its operative position in the bolt. Under such conditions, the linch pin also requires hammering or other forceful measures to remove it from the bolt when desired.

Also, some prior linch pins are provided with a straight, double shank portion with extremity barbs to lock the pin in place. With this arrangement, there is considerable difficulty in releasing the barbs to enable the pin to be removed from the bolt.

In the mentioned prior devices, the hammering or other forceful means employed to remove the linch pin from the bolt often so damages the linch pin that it cannot be reused.

It should be added that both mentioned types of prior linch pins are usually quite costly to manufacture.

OBJECTS OF THIS INVENTION

An important object of this invention is the provision of a linch pin which may easily be inserted in a transverse bore in a bolt without the use of any tool and which, likewise, may easily be removed from said bore while, nevertheless, not being subject to accidental dislodgment from said bore.

Another important object is the provision of a linch pin which is unaltered by use so that it may repeatedly be reused.

Another important object is the provision of a linch pin which may be economically manufactured.

All these and other objects and advantages are achieved by the provision of a linch pin having the serpentine characteristic as disclosed and described herein.

BRIEF DESCRIPTION OF THE DRAWING

In the accompanying drawing:

FIG. 1 is an elevational view of a linch pin according to a preferred first embodiment of this invention, shown in general association with a related bolt.

FIG. 2 is another elevational view of the linch pin of FIG. 1 with the extremity of the head end of the linch pin in close association with a bore in the related bolt.

FIG. 3 is an elevational view of a linch pin according to a second embodiment of this invention showing its tail extremity in close association with a bore in a related bolt.

DETAILED DESCRIPTION OF THE INVENTION

Referring to the first embodiment, shown in FIGS. 1 and 2, a linch pin 10, preferably formed of sturdy rod stock of malleable iron which is of circular shape in cross section uniformly along its length, is formed with a crook or hook shaped head 11 having a head extremity 12 sharply bent outwardly, and a serpentine tail 13 extending from said head to a tail extremity 14.

The linch pin is employed with a related, preferably steel bolt 15 having an enlarged head 16 at one end thereof and being formed toward its other end with a transverse bore 17, the ends of which preferably flare outwardly as at 18.

The bolt 15 is commonly employed for connection thereto of some instrumentality which is shown fragmentally as a sleeve portion 19 of a member which may be employed, for example, as a part of draft means for pulling a mobile piece of machinery or the like.

In such draft means, the head 16 of bolt prevents the sleeve portion 19 from sliding off the head end of the bolt; and the linch pin 10 serves to prevent said sleeve portion from sliding off the other end of the bolt.

The linch pin 10 is very easily positioned operatively by inserting its tail extremity 14 into the bolt's bore 17 and sliding the linch pin endwisely in said bore until it hangs from the bolt substantially as shown in full lines in FIG. 1.

A broken line indication of the linch pin appears in FIG. 1 to show one of the intermediate positions of the linch pin as it is slid toward its indicated final, full line position. It should be understood that the cross sectional diameter of the serpentine tail 13 of the linch pin is such as to afford it a close, but easily slideable fit in the bore 17. The flared ends 18 of the bore facilitate sliding of the linch pin in the bore without making the diameter of the bore excessively large at a point thereof intermediate its said flared ends.

FIG. 2 shows that the sharply bent head extremity 12 cannot pass through the bolt's bore 17 so that the linch pin can not become disengaged at that end thereof from the bolt, even though the latter were to turn axially during use.

As to such possible axial turning of the bolt 15 in use, the bolt, in some assemblies which may be employed, may be positively and independently restrained against axial turning. Such turning of the bolt as any occur in the absence of such rotational restraint would possibly result from vibration of the bolt and related elements in operation.

If the linch pin becomes upended by rotation of the bolt to the extent of approximately 180°, such turning would probably result from the vibration of the bolt and related parts. However, the vibrational condition which would cause such turning would cause continued turning of the bolt so that any tendency of the linch pin to slide by gravity out of the bolt's bore would be short lived, and the linch pin would not remain upended long enough for it to slide from the bolt's bore against the frictional opposition of the serpentine shaped tail 13 with respect to the side surface of the bore. Thus, before the linch pin could drop out of the bore 17, the bolt would again assume an axial position wherein the serpentine shape of the tail 13 would prevent disengagement of the linch pin from the bolt.

It will be understood that the serpentine shape of the tail 13 provides considerable frictional restraint against gravitation of the linch pin from the bore 17 when said pin is upended. This restraint would not be present if the tail 13 were straight rather than of serpentine shape.

In some assemblies wherein linch pins are employed, the bolt may be independently and positively held against axial turning, in which arrangements no problem exists as to accidental separation of the linch pin from the bolt.

Of course, even with the frictional restraint provided with reference to the bore of the bolt, there is no difficulty in manually inserting the linch pin 10 in the bolt's bore 17 or in manually removing it from said bore. Such insertion and removal does not in any way damage the linch pin so that it may be repeatly reused.

Referring to the second embodiment shown in FIG. 3, the linch pin 10b differs from linch pin 10 of FIGS. 1 and 2 only in that its tail extremity 14b is bifurcated to give it a slightly greater over all diameter that the remainder of the linch pin's tail and to give that tail extremity a very limited degree of resilience which would depend largely upon the composition and diameter of the rod stock used for the linch pin and the dimensions of the split 20b formed in bifurcating the tail extremity 14b.

Some, rather light manual force would ordinarily be required to push the tail extremity 14b through the bore 17 in installing the linch pin 10b on a bolt 15 or the like. Conversely, if some unusual operating conditions had caused sliding of the linch pin 10b almost to the point of dropping from the bore 17, the tail extremity 14b, in the absence of manual force, would prevent further sliding of the linch pin, thereby keeping it operative in the bore 17 to prevent the sleeve portion 19 from sliding off the bolt 15. With the application of rather light manual force to the linch pin 10b, it may easily be removed from the bolt in condition for reuse.

I claim:

1. A linch pin of sturdy rod stock of substantial rigidity and of uniform cross sectional dimension along a major portion of its length; said linch pin having an open-hook shaped head and a serpentine tail extending normally downwardly from said head and adapted to be extended with a close but easily slideable fit through a transverse bore in a related bolt; said hook shaped head being normally engageable loosely within said bore as a means for blocking a member on said bolt against dislodgment from the latter, and said tail being normally clear of said bore, and, by reason of its serpentine shape, serving to oppose sliding of the linch pin from said bore when the linch pin may be in an inverted position.

2. A linch pin according to claim 1, said head having a head extremity portion extending, relatively to the remainder of said head, at a degree of curvature sufficiently greater than any curvature present in said serpentine tail to prevent passage of said head extremity portion through said transverse bore.

3. A linch pin according to claim 1, said rod stock being of circular shape in cross section .

4. A linch pin according to claim 3, the curvatures of both said head and said tail extending in a common plane.

* * * * *